US012296422B2

(12) United States Patent
Chen et al.

(10) Patent No.: US 12,296,422 B2
(45) Date of Patent: May 13, 2025

(54) MULTI-CONNECTING ROD LINKAGE ANGLE ATTACHMENT HEAD

(71) Applicant: KEDE NUMERICAL CONTROL CO., LTD., Liaoning (CN)

(72) Inventors: Hu Chen, Liaoning (CN); Xin Deng, Liaoning (CN); Hongtao Tang, Liaoning (CN); Changlin Du, Liaoning (CN); Yapeng Li, Liaoning (CN); Cuijuan Guo, Liaoning (CN); Haibo Zhang, Liaoning (CN); Hongwei Sun, Liaoning (CN); Zhihong Wei, Liaoning (CN); Guoshuai Zhang, Liaoning (CN); Lixin Liu, Liaoning (CN); Dawei Wang, Liaoning (CN); Dapeng Dong, Liaoning (CN); Meng Lin, Liaoning (CN); Pei Liu, Liaoning (CN); Yanqing Bai, Liaoning (CN); Shaoyi Liu, Liaoning (CN); Zidan Ju, Liaoning (CN)

(73) Assignee: KEDE NUMERICAL CONTROL CO., LTD., Liaoning (CN)

( * ) Notice: Subject to any disclaimer, the term of this patent is extended or adjusted under 35 U.S.C. 154(b) by 511 days.

(21) Appl. No.: 17/788,500

(22) PCT Filed: Nov. 27, 2020

(86) PCT No.: PCT/CN2020/132123
§ 371 (c)(1),
(2) Date: Jun. 23, 2022

(87) PCT Pub. No.: WO2021/135761
PCT Pub. Date: Jul. 8, 2021

(65) Prior Publication Data
US 2023/0037001 A1 Feb. 2, 2023

(30) Foreign Application Priority Data

Dec. 31, 2019 (CN) .......................... 201911419369.5

(51) Int. Cl.
*B23Q 1/70* (2006.01)
*B23Q 5/04* (2006.01)
(52) U.S. Cl.
CPC ............... *B23Q 1/70* (2013.01); *B23Q 5/043* (2013.01)
(58) Field of Classification Search
CPC . B23Q 1/70; B23Q 1/52; B23Q 1/707; B23Q 5/36
See application file for complete search history.

(56) References Cited

FOREIGN PATENT DOCUMENTS

CN 101011797 A * 8/2007
CN 107252916 A * 10/2017

\* cited by examiner

*Primary Examiner* — Alan Snyder
*Assistant Examiner* — Wesley W Meaders
(74) *Attorney, Agent, or Firm* — Muncy, Geissler, Olds & Lowe, P.C.

(57) ABSTRACT

The present invention provides a multi-connecting rod linkage angle attachment head, including: a casing, a drive mechanism, and a spindle. The drive mechanism includes: a power mechanism, a connecting rod mechanism, and a fixing frame. The fixing frame is fixedly connected to an inner wall of the casing, and the power mechanism is fixedly connected to the fixing frame. The connecting rod mechanism includes: a first connecting rod, a second connecting rod and a third connecting rod. An end of the first connecting rod is rotatably connected to the fixing frame, and is fixedly connected to an output end of the power mechanism. The other end of the first connecting rod is rotatably connected to an end of the third connecting rod via a first pin. The other end of the third connecting rod is rotatably connected to an (Continued)

end of the second connecting rod via a second pin. The other end of the second connecting rod is fixed on a side wall of the spindle. The second connecting rod and the spindle are rotatably connected to a support bearing fixed in the casing. The drive mechanism of the present invention is far away from the spindle, and the interference range thereof to the spindle is small; the spindle can be automatically and continuously indexed, and can also perform linkage machining with small cutting amount, and thus, when the spindle swings by the same angle along a support shaft, the volume of the device is reduced; the structure is simple and the manufacturing cost is low.

5 Claims, 5 Drawing Sheets

MULTI-CONNECTING ROD LINKAGE ANGLE ATTACHMENT HEAD

TECHNICAL FIELD

The present invention relates to the field of machine tool processing, particularly, to a multi-connecting rod linkage angle attachment head.

BACKGROUND ART

In the case of deep cavity machining of box parts in the field of aviation such as casings and housings, at present, the common angle attachment heads are generally fixed-angle and lengthened attachment heads. Most of such attachment heads require a manual control of the angle and length of attachment head to realize the machining of parts. None of the above methods can realize the continuous indexing machining of parts, resulting in low machining efficiency.

SUMMARY OF INVENTION

The present invention provides a multi-connecting rod linkage angle attachment head to overcome the above technical problems.

The present invention provides a multi-connecting rod linkage angle attachment head, including: a casing; a drive mechanism; and a spindle with a cutter fixed at an end.

The drive mechanism includes: a power mechanism, a connecting rod mechanism and a fixing frame for supporting the power mechanism; the fixing frame is fixedly connected to an inner wall of the casing, and the power mechanism is fixedly connected to the fixing frame.

The connecting rod mechanism includes: a first connecting rod, a second connecting rod and a third connecting rod; an end of the first connecting rod is rotatably connected to the fixing frame, and is fixedly connected to an output end of the power mechanism, the other end of the first connecting rod is rotatably connected to an end of the third connecting rod via a first pin, the other end of the third connecting rod is rotatably connected to an end of the second connecting rod via a second pin, the other end of the second connecting rod is fixed on a side wall of the spindle; the second connecting rod and the spindle are rotatably connected to a support bearing fixed in the casing.

The rotation axis of the power mechanism is parallel to the horizontal plane, the rotation axes of the first connecting rod, the second connecting rod and the third connecting rod are all parallel to the rotation axis of the power mechanism; the power mechanism is located above the spindle.

An end of the third connecting rod close to the support bearing is a bent portion for preventing interference with the support bearing.

Further, an included angle a between a central axis of the first connecting rod and a straight line connecting a head end and a tail end of the third connecting rod is in the range of 0°<a<180°.

An included angle b between the straight line connecting the head end and the tail end of the third connecting rod and a central axis of the second connecting rod is in the range of 0°<b<180°; an included angle c between the central axis of the second connecting rod and a central axis of the spindle is in the range of 0°<c<90°.

In the initial state, the central axis of the spindle is located in the first quadrant of the coordinate system, and an included angle $\theta$ between the central axis of the spindle and the x-axis is in the range of 0°<$\theta$≤45°; and when the spindle rotates by the maximum angle, the central axis of the spindle is located in the third quadrant of the coordinate system, and the included angle between the central axis of the spindle and the y-axis is $\gamma$, and the sum of $\theta$ and $\gamma$ is 90°.

Further, the power mechanism includes a servo motor and a reducer.

An output end of the servo motor is connected to an input end of the reducer and an output end of the reducer is fixedly connected to an end of the first connecting rod.

Further, the angle attachment head also includes an angle measurement unit. The angle measurement unit is fixed on an inner side wall of the casing via a reading head bracket, and is located on an outer circular end surface of the support bearing.

Further, the angle attachment head also includes: a T-slot nut; a screw; a through hole; and a T-ring groove.

The second connecting rod is provided with the through hole perpendicular to the spindle, the T-ring groove is provided on a side wall of the spindle close to the second connecting rod, the T-slot nut slides in the T-ring groove, and the screw passes through the through hole and is screwed to the T-slot nut.

The drive mechanism of the present invention is far away from the spindle, and the interference range thereof to the spindle is small. The spindle can be automatically and continuously indexed, and can also perform linkage machining with small cutting amount, and thus, when the spindle swings along a support shaft by the same angle, the volume of the device is reduced; the structure is simple and the manufacturing cost is low.

BRIEF DESCRIPTION OF DRAWINGS

In order to illustrate the embodiments of the present invention or the technical solutions in the prior art more clearly, the following briefly introduces the accompanying drawings that need to be used in the description of the embodiments or the prior art. Obviously, the accompanying drawings in the following description are some embodiments of the present invention, and for a person skilled in the art, other drawings can also be obtained from these accompanying drawings without creative effort.

DESCRIPTION OF EMBODIMENTS

In order to make the purposes, technical solutions and advantages of the embodiments of the present invention clearer, the technical solutions in the embodiments of the present invention will be clearly and completely described below with reference to the accompanying drawings in the embodiments of the present invention. Obviously, the embodiments to be described are some, but not all, embodiments of the present invention. Based on the embodiments of the present invention, all other embodiments obtained by a person skilled in the art without creative efforts are within the protection scope of the present invention.

Figure 1:
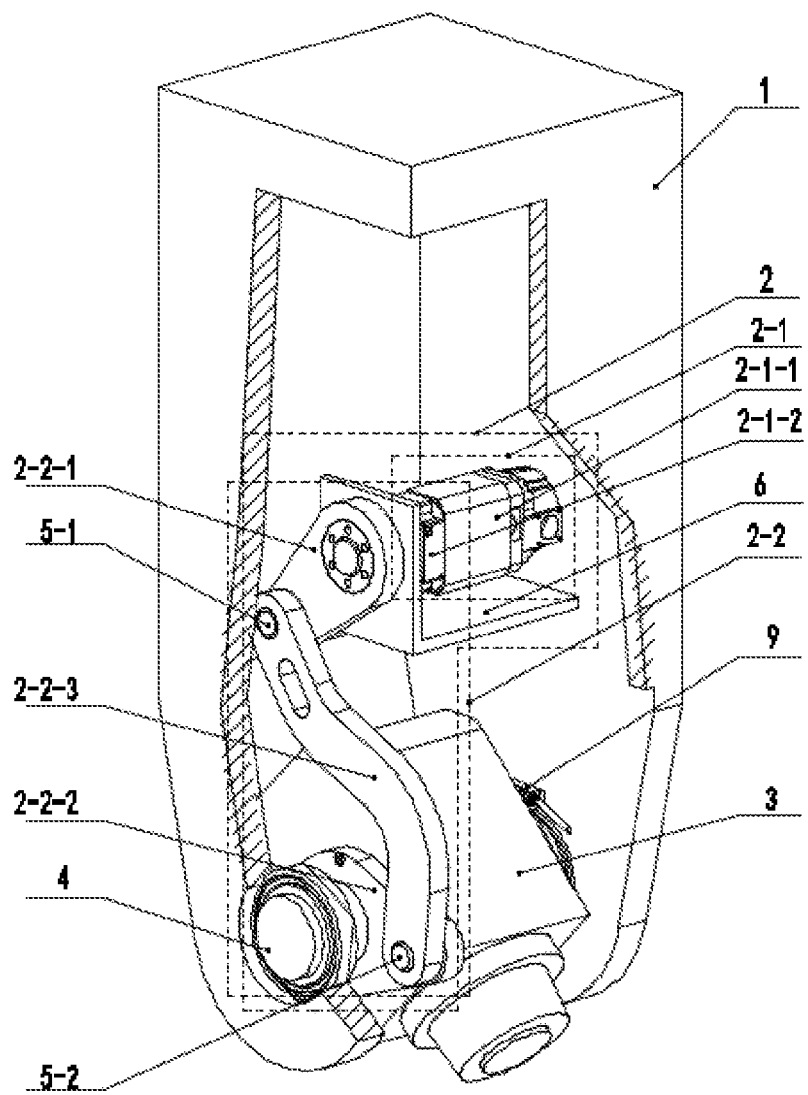
FIG. 1 is an overall schematic diagram of a multi-connecting rod linkage angle attachment head of the present invention.
Figure 2:
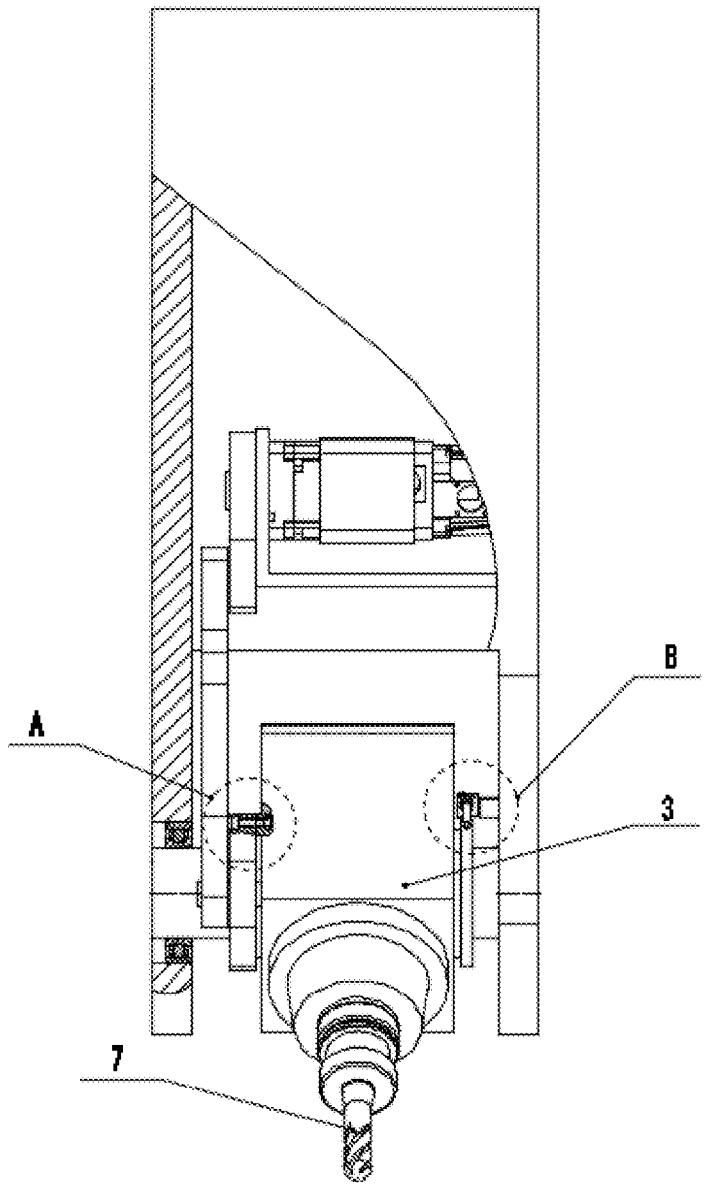
FIG. 2 is a front view of the multi-connecting rod linkage angle attachment head of the present invention.

The present invention provides a multi-connecting rod linkage angle attachment head. FIG. 1 is an overall schematic diagram of a multi-connecting rod linkage angle attachment head of the present invention. FIG. 2 is a front view of the multi-connecting rod linkage angle attachment head. The multi-connecting rod linkage angle attachment head includes: a casing 1; a drive mechanism 2; and a spindle 3 with a cutter 7 fixed at an end. The drive mechanism 2 includes: a power mechanism 2-1, a connecting rod mechanism 2-2 and a fixing frame 6 for supporting the power mechanism 2-1. The fixing frame 6 is fixedly connected to an inner wall of the casing 1, and the power mechanism 2-1 is fixedly connected to the fixing frame 6. The casing 1 is a rectangular stainless steel casing as a whole, and a support bearing 4 is laterally fixed at a bottom in the casing 1. The spindle 3 is an electric spindle, the end thereof is fixed with the cutter 7 for machining parts. The cutter 7 rotates synchronously with the spindle 3. The spindle 3 is fixed on an end of the connecting rod mechanism 2-2. The connecting rod mechanism 2-2 is a rotary pair.

The connecting rod mechanism 2-2 includes: a first connecting rod 2-2-1, a second connecting rod 2-2-2 and a third connecting rod 2-2-3. In order to better realize the driving effect, the power mechanism 2-1 includes: a servo motor 2-1-1 and a reducer 2-1-2. An output end of the servo motor 2-1-1 is connected to an input end of the reducer 2-1-2 and an output end of the reducer 2-1-2 is fixedly connected to an end of the first connecting rod 2-2-1 and is rotatably connected to the fixing frame 6. The other end of the first connecting rod 2-2-1 is rotatably connected to an end of the third connecting rod 2-2-3 via a first pin 5-1, and the other end of the third connecting rod 2-2-3 is rotatably connected to an end of the second connecting rod 2-2-2 via a second pin 5-2. The other end of the second connecting rod 2-2-2 is fixed on a side wall of the spindle 3, and the second connecting rod 2-2-2 and the spindle 3 are rotatably connected to the support bearing 4 fixed in the casing 1. The servo motor 2-1-1 drives the first connecting rod 2-2-1 to rotate along the horizontal axis via the reducer 2-1-2. The first connecting rod 2-2-1 drives the third connecting rod 2-2-3 to rotate along the axis of the first pin 5-1. The third connecting rod 2-2-3 drives the second connecting rod 2-2-2 to rotate along the second pin 5-2. The second connecting rod 2-2-2 drives the spindle 3 to rotate around the support bearing 4, and then the support bearing 4 drives the cutter 7 to rotate.

The rotation axis of the power mechanism 2-1 is parallel to the horizontal plane. The rotation axes of the first connecting rod 2-2-1, the second connecting rod 2-2-2 and the third connecting rod 2-2-3 are all parallel to the rotation axis of the power mechanism 2-1. The power mechanism 2-1 is located above the spindle 3. The arrangement of this structure reduces the overall volume of the present invention, and is beneficial to the machining of deep cavities of box parts in the aviation field such as casing and housing.

An end of the third connecting rod 2-2-3 close to the support bearing 4 is a bent portion for preventing interference with the support bearing 4. The bent portion prevents the interference between the third connecting rod 2-2-3 and the support bearing 4, and meanwhile increases the rotation angles of the second connecting rod 2-2-2 and the spindle 3. The drive mechanism of the present invention is far away from the spindle, and the overall size of the structure is small, and the interference range of the drive mechanism to the spindle is small.

Figure 3:
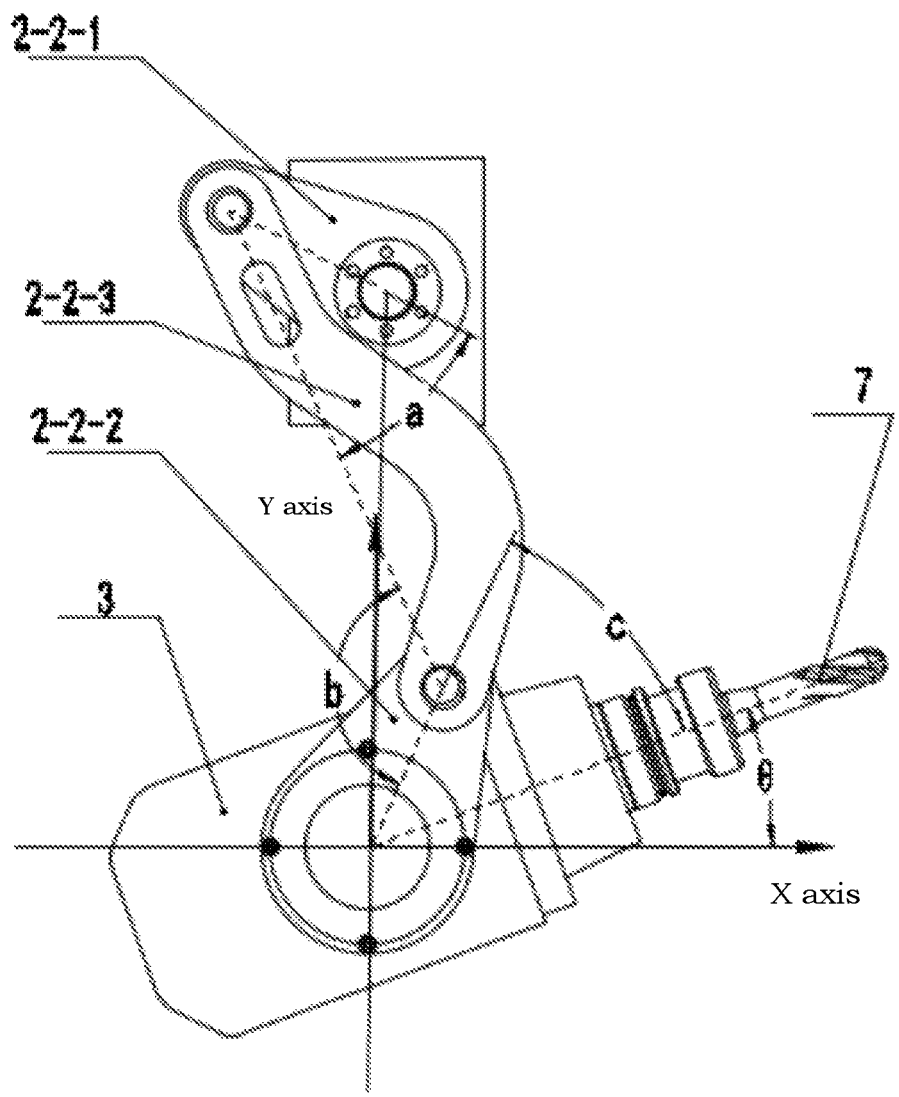
FIG. 3 is an overall schematic diagram of the multi-connecting rod linkage angle attachment head of the present invention when a spindle is at an initial position.
Figure 4:
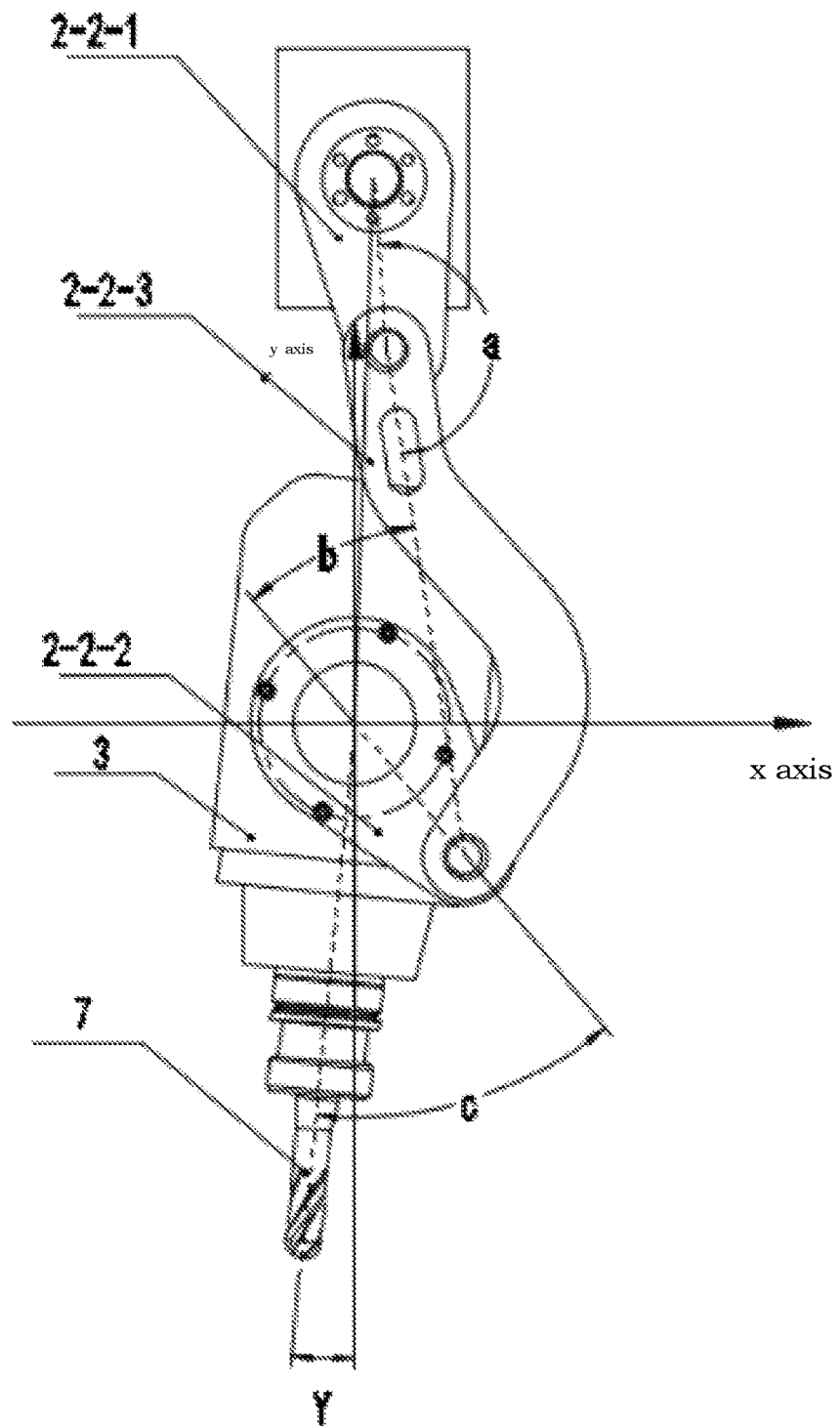
FIG. 4 is a schematic diagram of the multi-connecting rod linkage angle attachment head of the present invention when the spindle is rotated to the maximum angle.

Further, FIG. 3 is an overall schematic diagram of the multi-connecting rod linkage angle attachment head of the present invention when the spindle is at the initial position. FIG. 4 is a schematic diagram of the multi-connecting rod linkage angle attachment head of the present invention when the spindle is rotated to the maximum angle. An included angle a between a central axis of the first connecting rod 2-2-1 and a straight line connecting a head end and a tail end of the third connecting rod 2-2-3 is in the range of $0°<a<180°$. An included angle b between the straight line connecting the head end and the tail end of the third connecting rod 2-2-3 and a central axis of the second connecting rod 2-2-2 is in the range of $0°<b<180°$; an included angle c between the central axis of the second connecting rod 2-2-2 and a central axis of the spindle 3 is in the range of $0°<c<90°$. In this embodiment, $\theta$ is preferably 45°. In the initial state, the central axis of the spindle 3 is located in the first quadrant of the coordinate system, and an included angle $\theta$ between the central axis of the spindle 3 and the x-axis is in the range of $0°<\theta\leq45°$. When the spindle 3 rotates by the maximum angle, the central axis of the spindle 3 is located in the third quadrant of the coordinate system, and the included angle between the central axis of the spindle 3 and the y-axis is $\gamma$, and the sum of $\theta$ and $\gamma$ is 90°. That is, if $\theta$ is 30°, $\gamma$ is 60°. The rotation axis position of an end of the first connecting rod 2-2-1 connected to the output end of the servo motor 2-1-1 and the rotation axis position of the spindle 3 are fixed, and thus, when the rotation axis of the first pin 5-1 connecting the third connecting rod 2-2-3 and the first connecting rod 2-2-1 is located just above the rotation axis of an end of the first connecting rod 2-2-1 connected to the output end of the servo motor 2-1-1, the first connecting rod 2-2-1 is at the rotation limit position thereof; when the rotation axis of the second pin 5-2 connecting the third connecting rod 2-2-3 and the second connecting rod 2-2-2 is located just below the rotation axis of the spindle 3, the second connecting rod 2-2-2 is at the rotation limit position thereof. On the premise that the volume and size of the casing 1 are certain, when the above-mentioned angles a, b, and c reach certain values, the rotation angle of the cutter 7 can be maximized, and that is suitable for the large-scale machining on the bottom of deep cavity. With the same volume of the casing 1, the rotation angle of the cutter 7 reaches the maximum.

Figure 6:
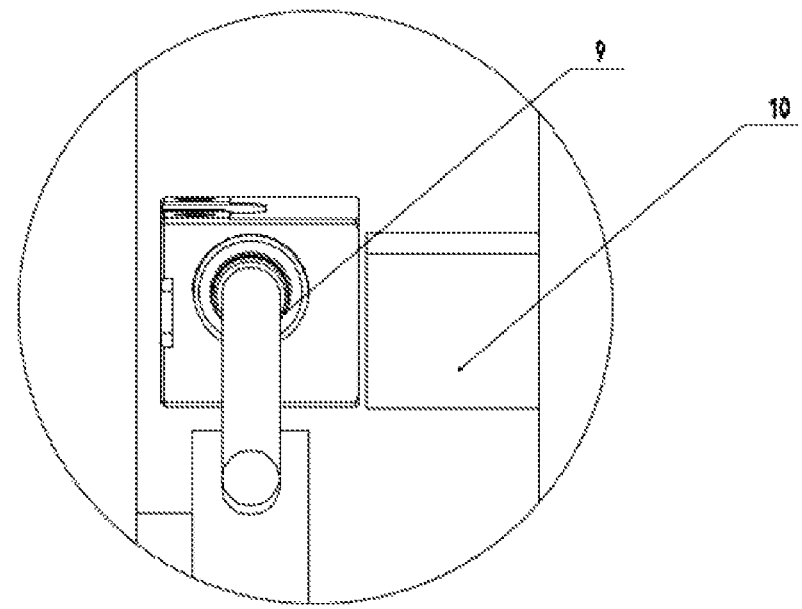
FIG. 6 is an enlarged view of B in FIG. 2 of the multi-connecting rod linkage angle attachment head of the present invention.

Further, as shown in FIG. 6, the angle attachment head also includes an angle measurement unit 9. The angle measurement unit 9 is fixed on an inner side wall of the casing 1 via a reading head bracket 10, and is located on an outer circular end surface of the support bearing 4. The angle measurement unit 9 is specifically a circular induction synchronizer with small size and high precision. The circular induction synchronizer includes a circular grating ruler and a reading head. The circular grating is used to detect the rotation angle of the spindle 3 to ensure that the cutter 7 is rotated in place (the working principle of the circular induction synchronizer is a prior art and will not be repeated in this application).

Figure 5:
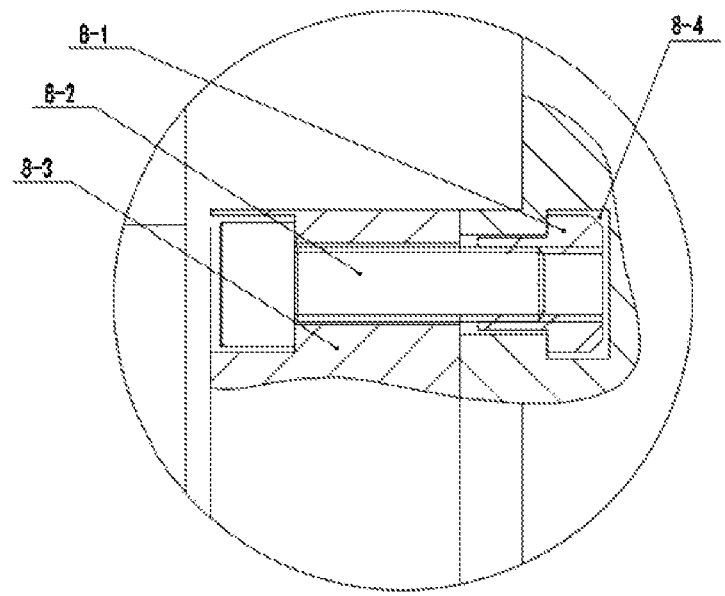
FIG. 5 is an enlarged view of A in FIG. 2 of the multi-connecting rod linkage angle attachment head of the present invention.

Further, in order to make the included angle c between the central axis of the second connecting rod 2-2-2 and the central axis of the spindle 3 adjustable, as shown in FIG. 5, the angle attachment head also includes: a T-slot nut 8-1, a screw 8-2, a through hole 8-3, and a T-ring groove 8-4.

The second connecting rod 2-2-2 is provided with the through hole 8-3 perpendicular to the spindle 3. The T-ring groove 8-4 is provided on a side wall of the spindle 3 close to the second connecting rod 2-2-2. The T-slot nut 8-1 slides in the T-ring groove 8-4, and the screw 8-2 passes through the through hole 8-3 and is screwed to the T-slot nut 8-1. The second connecting rod 2-2-2 is screwed to the T-slot nut 8-14 via the screw 8-2, and slides the T-slot nut 8-1 in the T-ring groove 8-4 to adjust the included angle c between the central axis of the second connecting rod 2-2-2 and the central axis of the spindle 3 to meet different initial angle requirements of the cutter 7.

Finally, it should be noted that the above embodiments are only used to illustrate the technical solutions of the present invention, but not to limit them. Although the present invention has been described in detail with reference to the foregoing embodiments, a person skilled in the art should understand that the technical solutions described in the foregoing embodiments can still be modified, or some or all of the technical features thereof can be equivalently substituted. However, these modifications or substitutions do not make the essence of the corresponding technical solutions deviate from the scope of the technical solutions of the embodiments of the present invention.

The invention claimed is:

1. A multi-connecting rod linkage angle attachment head, comprising: a casing; a drive mechanism; and a spindle with a cutter fixed at an end, wherein:
   the drive mechanism includes: a power mechanism, a connecting rod mechanism and a fixing frame for supporting the power mechanism; the fixing frame is fixedly connected to an inner wall of the casing, and the power mechanism is fixedly connected to the fixing frame;
   the connecting rod mechanism includes: a first connecting rod, a second connecting rod and a third connecting rod; an end of the first connecting rod is rotatably connected to the fixing frame, and is fixedly connected to an output end of the power mechanism, the other end of the first connecting rod is rotatably connected to an end of the third connecting rod via a first pin, the other end of the third connecting rod is rotatably connected to an end of the second connecting rod via a second pin, the other end of the second connecting rod is fixed on a side wall of the spindle; the second connecting rod and the spindle are rotatably connected to a support bearing fixed in the casing;
   the rotation axis of the power mechanism is parallel to the horizontal plane, the rotation axes of the first connecting rod, the second connecting rod and the third connecting rod are all parallel to the rotation axis of the power mechanism; the power mechanism is located above the spindle; and
   an end of the third connecting rod close to the support bearing is a bent portion for preventing interference with the support bearing.

2. The angle attachment head according to claim 1, wherein: an included angle a between a central axis of the first connecting rod and a straight line connecting a head end and a tail end of the third connecting rod is in the range of $0°<a<180°$;
   an included angle b between the straight line connecting the head end and the tail end of the third connecting rod and a central axis of the second connecting rod is in the range of $0°<b<180°$; an included angle c between the central axis of the second connecting rod and a central axis of the spindle is in the range of $0°<c<90°$;
   in the initial state, the central axis of the spindle is located in the first quadrant of the coordinate system, and an included angle $\theta$ between the central axis of the spindle and the x-axis is in the range of $0°<\theta\leq 45°$; and when the spindle rotates by the maximum angle, the central axis of the spindle is located in the third quadrant of the coordinate system, and the included angle between the central axis of the spindle and the y-axis is $\gamma$, and the sum of $\theta$ and $\gamma$ is $90°$.

3. The angle attachment head according to claim 1, wherein: the power mechanism includes a servo motor and a reducer; and
   an output end of the servo motor is connected to an input end of the reducer and an output end of the reducer is fixedly connected to an end of the first connecting rod.

4. The angle attachment head according to claim 1, further comprising: an angle measurement unit, wherein the angle measurement unit is fixed on an inner side wall of the casing via a reading head bracket, and is located on an outer circular end surface of the support bearing.

5. The angle attachment head according to claim 1, further comprising: a T-slot nut; a screw; a through hole; and a T-ring groove, wherein
   the second connecting rod is provided with the through hole perpendicular to the spindle, the T-ring groove is provided on a side wall of the spindle close to the second connecting rod, the T-slot nut slides in the T-ring groove, and the screw passes through the through hole and is screwed to the T-slot nut.

* * * * *